(12) United States Patent
Miyabe

(10) Patent No.: US 8,594,127 B2
(45) Date of Patent: Nov. 26, 2013

(54) COMMUNICATION DEVICE AND COMMUNICATION METHOD

(75) Inventor: Masatake Miyabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 749 days.

(21) Appl. No.: 12/570,253

(22) Filed: Sep. 30, 2009

(65) Prior Publication Data

US 2010/0085974 A1 Apr. 8, 2010

(30) Foreign Application Priority Data

Oct. 3, 2008 (JP) ................ 2008-258081

(51) Int. Cl.
*H04J 3/16* (2006.01)
(52) U.S. Cl.
USPC ........................................ 370/466
(58) Field of Classification Search
None
See application file for complete search history.

(56) References Cited

U.S. PATENT DOCUMENTS

| | | | | |
|---|---|---|---|---|
| 7,283,465 B2* | 10/2007 | Zelig et al. | ...... | 370/219 |
| 7,372,870 B2* | 5/2008 | Huang et al. | ...... | 370/466 |
| 7,515,605 B2* | 4/2009 | Harel et al. | ...... | 370/466 |
| 7,606,203 B1* | 10/2009 | Shabtay et al. | ...... | 370/332 |
| 7,613,188 B1* | 11/2009 | French et al. | ...... | 370/392 |
| 7,756,125 B2* | 7/2010 | Sinicrope et al. | ...... | 370/389 |
| 7,782,847 B2* | 8/2010 | Hua et al. | ...... | 370/389 |
| 2007/0280267 A1* | 12/2007 | Ould-Brahim | ...... | 370/395.53 |
| 2008/0304476 A1* | 12/2008 | Pirbhai et al. | ...... | 370/356 |
| 2009/0245263 A1* | 10/2009 | Sato | ...... | 370/400 |
| 2010/0085974 A1* | 4/2010 | Miyabe | ...... | 370/395.31 |

FOREIGN PATENT DOCUMENTS

JP 2006-121434 5/2006

OTHER PUBLICATIONS

*RFC 3031* Jan. 2001 MPLS Architecture, pp. 1-61.
*RFC 3032* Jan. 2001 MPLS Stack Encoding, pp. 1-23.
*RFC 3985* Mar. 2005 PWE3 Architecture, pp. 1-42.
*RFC 4447* Apr. 2006, Pseudowire Setup & Maintenance using Label Distributed Protocol pp. 1-33.
"Media access control frame structure", *IEEE Std 802.3-2005, Sec. 1* Dec. 9, 2005, pp. 1-628.
Japanese Office Action mailed Apr. 10, 2012 for corresponding Japanese Application No. 2008-258081, with English-language translation.

* cited by examiner

*Primary Examiner* — Robert Wilson
(74) *Attorney, Agent, or Firm* — Fujitsu Patent Center

(57) ABSTRACT

A communication device includes: a transmission label table storage that stores a transmission label table that holds pseudo wire labels for each header information of Ethernet (standardized by IEEE 802.3 committee) frames; and an encapsulation unit that deletes the header information from the Ethernet (standardized by IEEE 802.3 committee) frame, adds a pseudo wire label and an MPLS tunnel label to the Ethernet (standardized by IEEE 802.3 committee) frame and transmits a packet to an MPLS network via a pseudo wire, when the header information of the received Ethernet (standardized by IEEE 802.3 committee) frame agrees with the header information held in the transmission label table.

20 Claims, 14 Drawing Sheets

US 8,594,127 B2

COMMUNICATION DEVICE AND COMMUNICATION METHOD

CROSS-REFERENCE TO RELATED APPLICATION

This application is based upon and claims the benefit of priority of the prior Japanese Patent Application No. 2008-258081, filed on Oct. 3, 2008, the entire contents of which are incorporated herein by reference.

FIELD

A certain aspect of the embodiments discussed herein is related to a communication device and a communication method.

BACKGROUND

A communication network that provides services to transmit Ethernet (standardized by IEEE 802.3 committee) frames via a pseudo wire in an MPLS (Multi Protocol Label Switching) has been developed, as is disclosed in RFC 3031, RFC 3032, RFC 3985 and IEEE Std 802.3.

To transmit the Ethernet (standardized by IEEE 802.3 committee) frame transparently, an encapsulation of the Ethernet (standardized by IEEE 802.3 committee) frame with a pseudo wire label, a tunnel label and a physical layer is necessary within an MPLS network. According to related arts, a whole Ethernet (standardized by IEEE 802.3 committee) service frame received from a user is encapsulated with the pseudo wire label, and is transmitted by the MPLS network.

SUMMARY

According to an aspect of the present invention, a communication device includes a transmission label table storage that stores a transmission label table that holds pseudo wire labels for each header information of Ethernet (standardized by IEEE 802.3 committee) frames, and an encapsulation unit that deletes the header information from the Ethernet (standardized by IEEE 802.3 committee) frame, adds a pseudo wire label and an MPLS tunnel label to the Ethernet (standardized by IEEE 802.3 committee) frame and transmits a packet to an MPLS network via a pseudo wire, when the header information of the received Ethernet (standardized by IEEE 802.3 committee) frame agree with the header information held in the transmission label table.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

As described previously, according to related arts, a whole Ethernet (standardized by IEEE 802.3 committee) service frame received from a user is encapsulated with the pseudo wire label, and is transmitted by the MPLS network. Thus, a use efficiency of the MPLS network is low and housing more services is difficult.

A description will now be given of embodiments of the present invention with reference to the accompanying drawings.

First Embodiment

Figure 1:
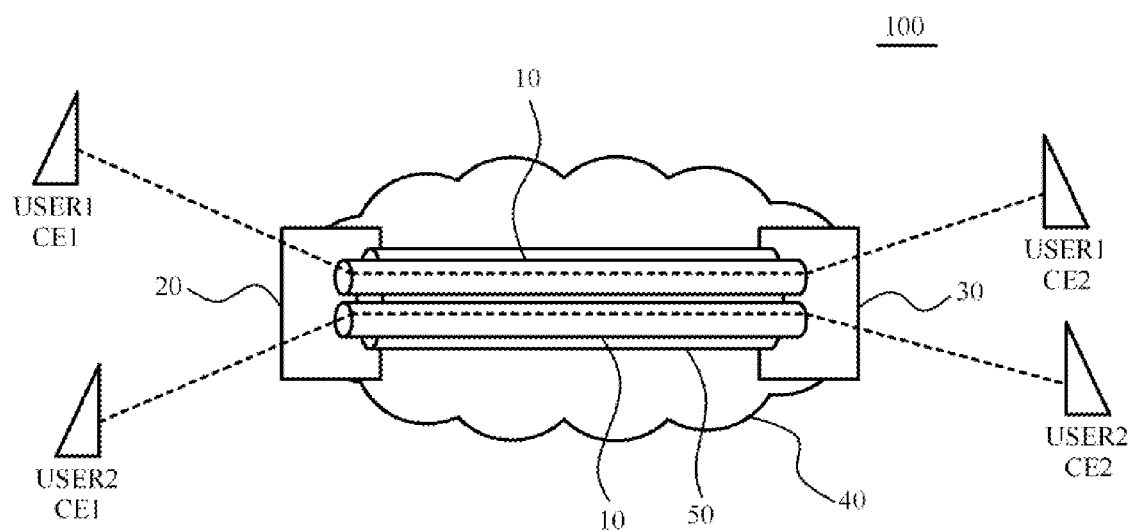
FIG. 1 is a schematic view illustrating a whole configuration of a communication device in accordance with first embodiment of the present invention.

FIG. 1 is a schematic view illustrating a whole configuration of a communication network 100 in accordance with the first embodiment of the present invention. As illustrated in FIG. 1, in the communication network 100, an ingress edge node 20 is coupled to an egress edge node 30 via a pseudo wire 10. The pseudo wire 10 is built in an MPLS tunnel 50 of an MPLS network 40. The Ethernet (standardized by IEEE 802.3 committee) frame transmission services for USER 1 and USER 2 are illustrated in FIG. 1.

Figure 2:
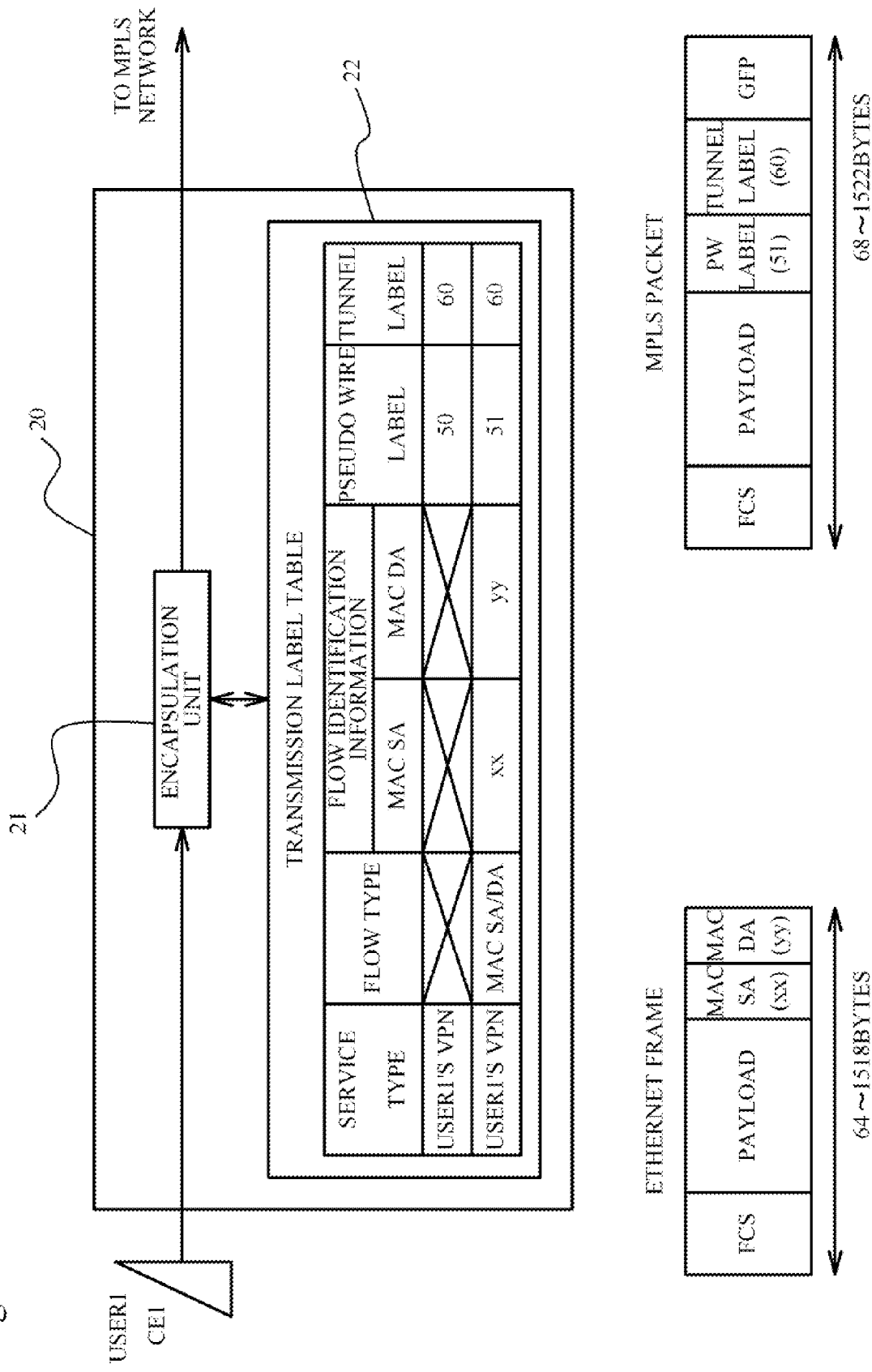
FIG. 2 is a schematic view illustrating operations of an ingress edge node.

FIG. 2 is a schematic view illustrating operations of the ingress edge node 20. The ingress edge node 20 includes an encapsulation unit 21, and a transmission label table storage 22 that stores a transmission label table. The transmission label table holds service types, flow types, flow identification information, and pseudo wire labels and tunnel labels for each different flow type and flow identification information. The flow type means a field used for identifying the flow. For example, the flow type is a combination of MAC (Media Access Control) SA and MAC DA. The flow identification information means a tangible filter value to identify the flow. For example, the flow identification information is values of MAC SA and MAC DA.

The encapsulation unit 21 receives the Ethernet (standardized by IEEE 802.3 committee) frame from a customer edge 1 (CE1) of USER 1. The encapsulation unit 21 determines the pseudo wire label value and the tunnel label value based on the entry corresponding to USER 1's VPN (Virtual Private Network) in the transmission label table. The encapsulation unit 21 transmits an MPLS packet with the determined label values to the MPLS network 40.

In this embodiment, as an example, the pseudo wire label 50 is assigned to the flow that has the service type of USER 1's VPN. The pseudo wire label 51 is assigned to the flow that has the service type of USER 1's VPN, MAC SA of xx, and MAC DA of yy.

Assume that the encapsulation unit 21 receives the Ethernet (standardized by IEEE 802.3 committee) frame with the combination of MAC SA and MAC DA that is xx and yy within the USER 1's VPN. The service type, the flow type, and the flow identification information of the received Ethernet (standardized by IEEE 802.3 committee) frame agree with the service type, the flow type, and the flow identification information held in the transmission label table, respectively. In this case, the encapsulation unit 21 deletes MAC SA and MAC DA from the Ethernet (standardized by IEEE 802.3 committee) frame received from the customer edge 1 of USER 1. The encapsulation unit 21 adds the pseudo wire label and the tunnel label to the Ethernet (standardized by IEEE 802.3 committee) frame, and transmits the Ethernet (standardized by IEEE 802.3 committee) frame to the MPLS network 40 as a packet.

Figure 3:
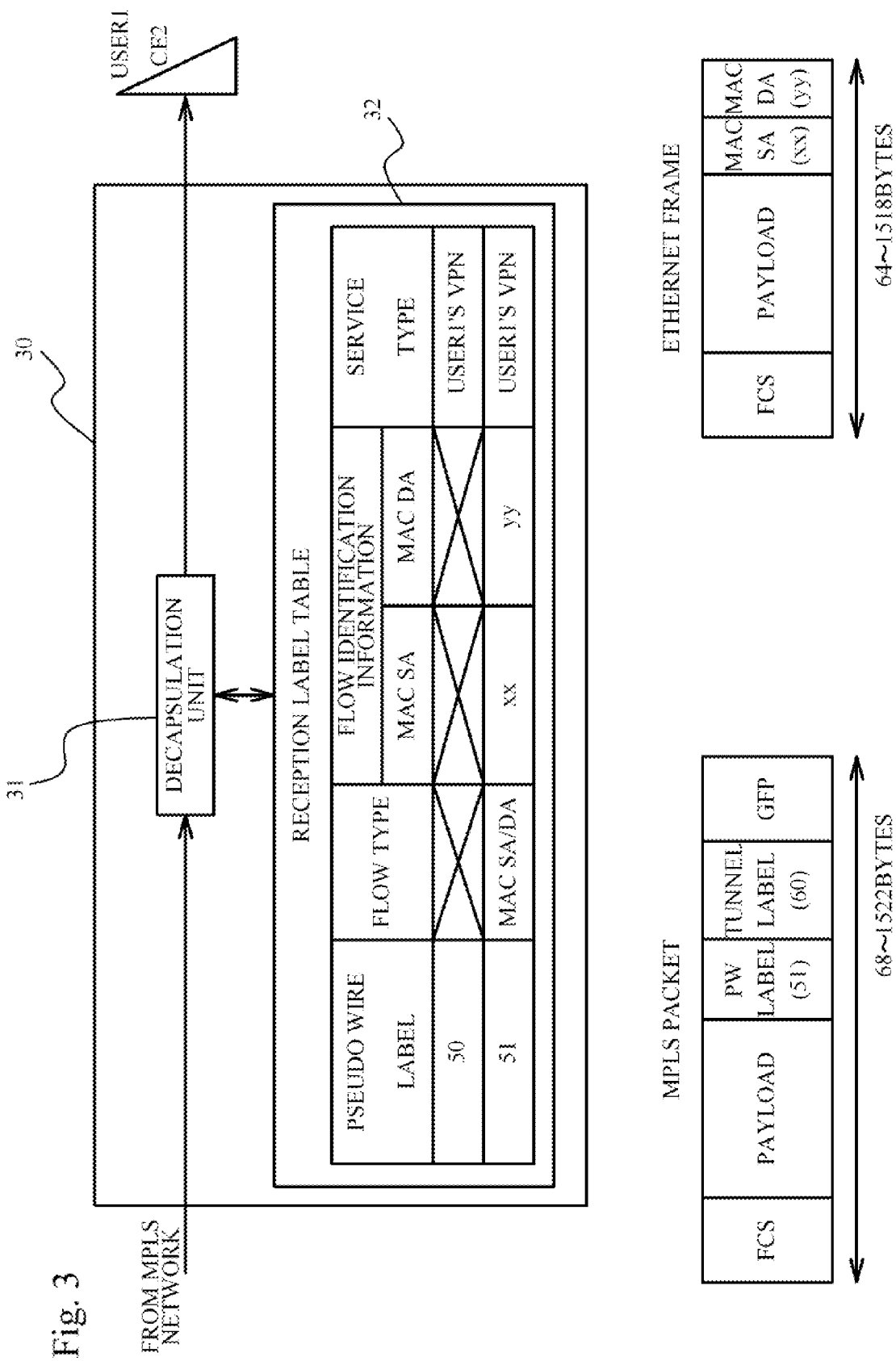
FIG. 3 is a schematic view illustrating operations of an egress edge node.

FIG. 3 is a schematic view illustrating operations of the egress edge node 30. The egress edge node 30 includes a reception label table storage 32 that stores a reception label table. The reception label table holds service types, flow types, flow identification information, and pseudo wire labels for each different flow type and flow identification information.

Upon receiving the packet, the decapsulation unit 31 refers to the reception label table. When the received packet has the pseudo wire label that agrees with the pseudo wire label held in the reception table, the decapsulation unit 31 deletes the pseudo wire label and the tunnel label from the packet. The decapsulation unit 31 adds header information to the packet based on the flow type and the flow identification information, and transmits the Ethernet (standardized by IEEE 802.3 committee) frame to an Ethernet (standardized by IEEE 802.3 committee) port to which the USER 1 is related based on the service type.

Concretely, assume that the decapsulation unit 31 receives the packet with the pseudo wire label 51. In this embodiment, this pseudo wire label value (=51) is used only for the flow that has MAC SA of xx and MAC DA of yy. Thus, after deleting the tunnel label and the pseudo wire label, the decapsulation unit 31 adds MAC SA of xx and MAC DA of yy to the packet, and forwards the Ethernet (standardized by IEEE 802.3 committee) frame to the VPN of USER 1.

Now, the description will be given of a case that the ingress edge node 20 receives the Ethernet (standardized by IEEE 802.3 committee) frame with the combination of MAC SA and MAC DA that is xx and zz not held in the transmission label table within the USER 1's VPN. In this case, the encapsulation unit 21 adds the pseudo wire label 50 and the tunnel label 60 to the Ethernet (standardized by IEEE 802.3 committee) frame based on the entry that does not have the service type of USER 1's VPN and the flow identification information of null, and transmits the MPLS packet to the MPLS network 40.

The MPLS network 40 transmits the packet to the egress edge node 30 while converting tunnel label value. Upon receiving the packet with the pseudo wire label 50, based on the reception label table, the decapsulation unit 31 determines that the packet is within the USER 1's VPN but is not flow-identified. In this case, the decapsulation unit 31 deletes the tunnel label and the pseudo wire label, and forwards the Ethernet (standardized by IEEE 802.3 committee) frame to the USER 1's VPN.

According to this embodiment, the amount of the information to be transmitted within the MPLS network 40 is reduced by identifying the flow of each service traffic and assigning the pseudo wire label to each flow. In this embodiment, MAC SA and MAC DA are deleted. The deletion of MAC SA and MAC DA improves the use efficiency of the MPLS network 40.

Second Embodiment

Figure 4:
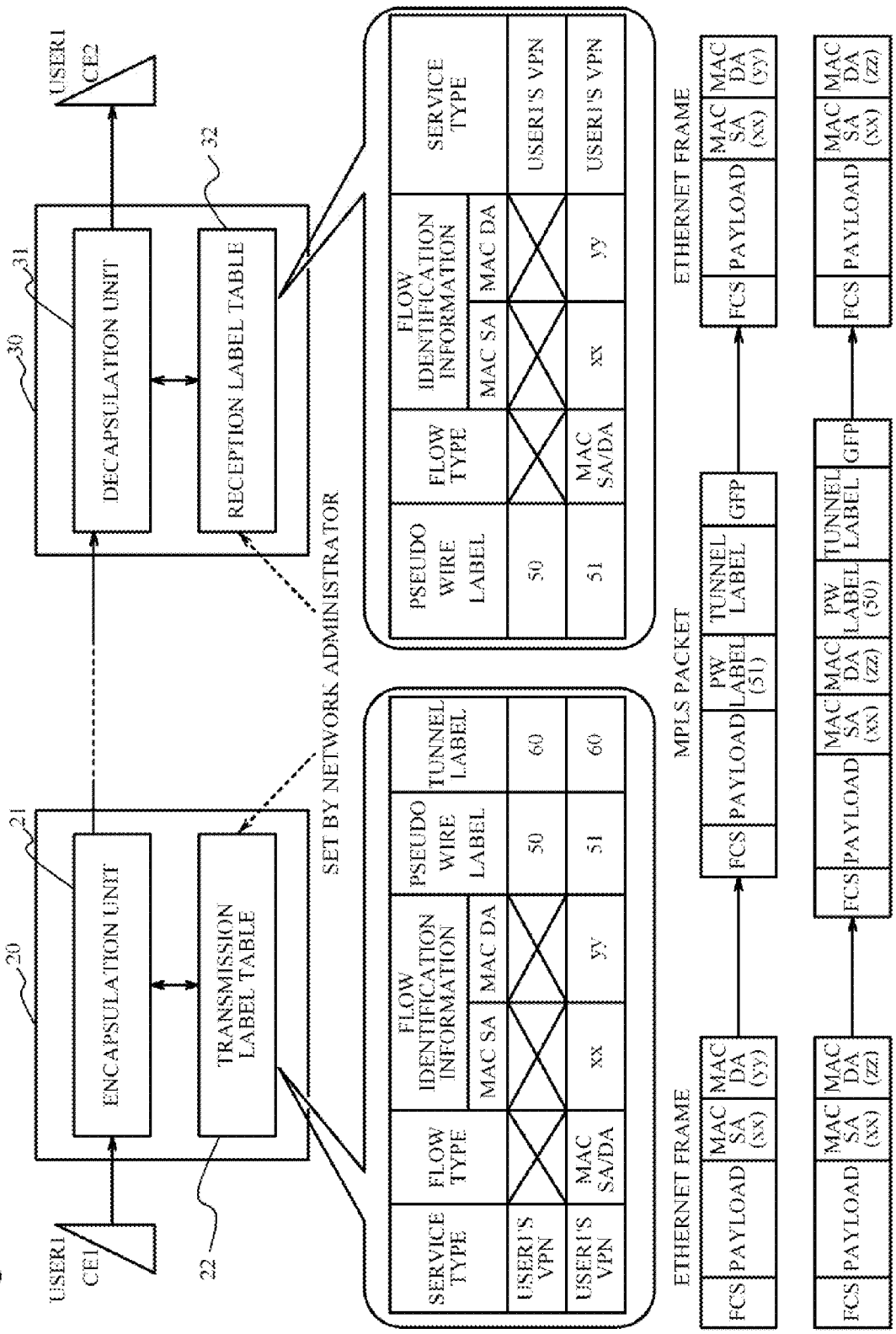
FIG. 4 is an exemplary diagram illustrating that a network administrator sets a label table manually.

A method to assign the label described in the first embodiment may be that a network administrator manually sets up the label tables of the ingress edge node 20 and the egress edge node 30. The second embodiment describes that the network administrator manually sets the flow identified with MAC SA/DA, and the pseudo wire label value corresponding to the flow to the label table. Now the description of the second embodiment is given referring to FIG. 4.

The transmission label table storage 22 stores the transmission label table set by the network administrator. The reception label table storage 32 stores the reception label table set by the network administrator. As an example, the pseudo wire label 50 is assigned to the flow with the service type of USER 1's VPN by the network administrator. The pseudo wire label 51 is assigned to the flow with the service type of USER 1's VPN, MAC SA of xx, and MAC DA of yy.

Assume that the ingress edge node 20 receives the Ethernet (standardized by IEEE 802.3 committee) frame with the combination of MAC SA and MAC DA that is xx and yy within the USER 1's VPN. In this case, the encapsulation unit 21 deletes the flow identification information MAC SA/DA from the Ethernet (standardized by IEEE 802.3 committee) frame, adds the pseudo wire label 51 and the tunnel label 60 corresponding to MAC SA of xx and MAC DA of yy, and transmits the MPLS packet to the MPLS network 40.

The MPLS network 40 transmits the packet to the egress edge node 30 while converting the tunnel label value. Upon receiving the packet with the pseudo wire label 51, the decapsulation unit 31 refers to the reception label table. The decapsulation unit 31 determines that the received packet is related to the flow with MAC SA of xx and MAC DA of yy within the USER1's VPN. In this case, the decapsulation unit 31 deletes the tunnel label and the pseudo wire label, regenerates the Ethernet (standardized by IEEE 802.3 committee) frame by adding MAC SA of xx and MAC DA of yy, and forwards the Ethernet (standardized by IEEE 802.3 committee) frame to the USER 1's VPN.

According to this embodiment, the transmission label table and the reception label table are set manually. The amount of the information is reduced by assigning the pseudo wire label to each flow manually. The reduction in the amount of the information improves the use efficiency of the MPLS network 40.

Third Embodiment

Another method to assign the label is that the ingress edge node 20 and the egress edge node 30 identify the flow automatically, and set up the label table by signaling. The third embodiment describes that the pseudo wire label is assigned to the flow automatically by signaling when the flow is identified. Now the description of this embodiment is given referring to FIG. 5.

Figure 5:
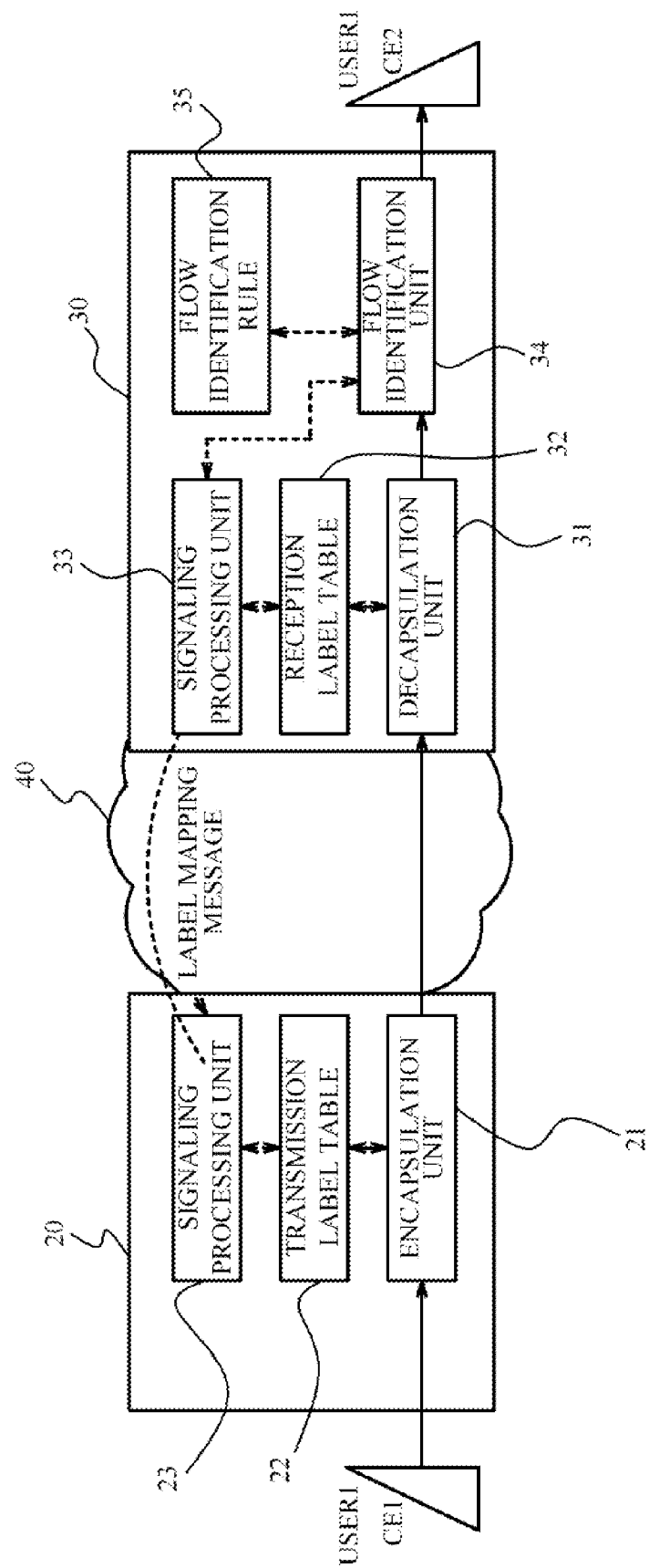
FIG. 5 is an exemplary diagram illustrating that a label table is set automatically.

FIG. 5 illustrates the configurations of devices when the egress edge node 30 identifies the flow and sets the label table by signaling. For example, a flow identification rule is set to detect the flow when the Ethernet (standardized by IEEE 802.3 committee) frames with the same combination of MAC SA and MAC DA pass the predetermined number of times (e.g. 10 times) within a predetermined time period (e.g. 1 second). The flow identification rule is set to discards the flow when the Ethernet (standardized by IEEE 802.3 committee) frame with this combination of MAC SA/DA does not pass for predetermined time (e.g. 5 seconds). The flow identification rule is stored in a flow identification rule storage 35.

According to this flow identification rule, a flow identification unit 34 of the egress edge node 30 identifies the flow from service traffic. A signaling processing unit 33 of the egress edge node 30 assigns the pseudo wire to each flow identified by the flow identification unit 34. The signaling processing unit 33 writes the pseudo wire corresponding to the flow type into the reception label table, and reports the pseudo wire to the ingress edge node 20 with a label mapping message.

Figure 6:
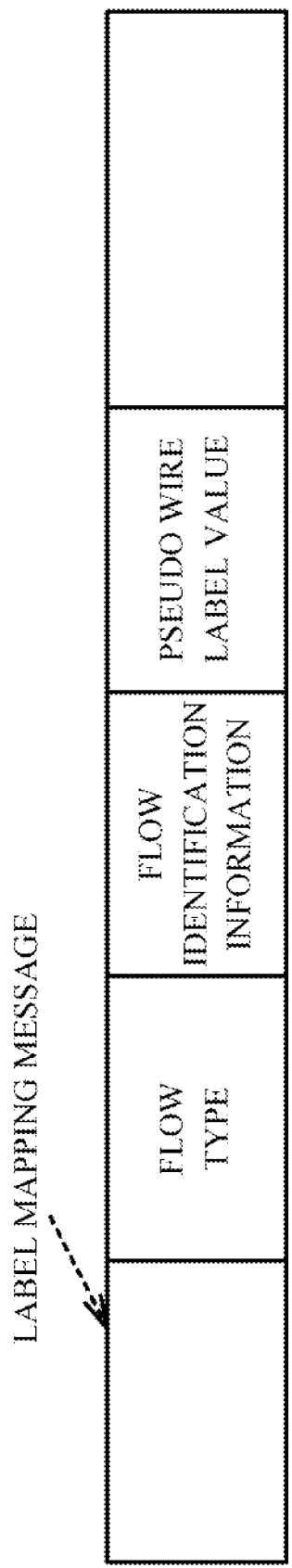
FIG. 6 illustrates a label mapping message to which a flow type and flow identification information are added.

In this case, the flow type and the flow identification information illustrated in FIG. 6 are added to the label mapping message. Upon receiving the label mapping message including these information, a signaling processing unit 23 of the ingress edge node 20 writes the pseudo wire label for this flow into the transmission label table. This enables the encapsulation unit 21 to use the flow identification information.

Figure 7:
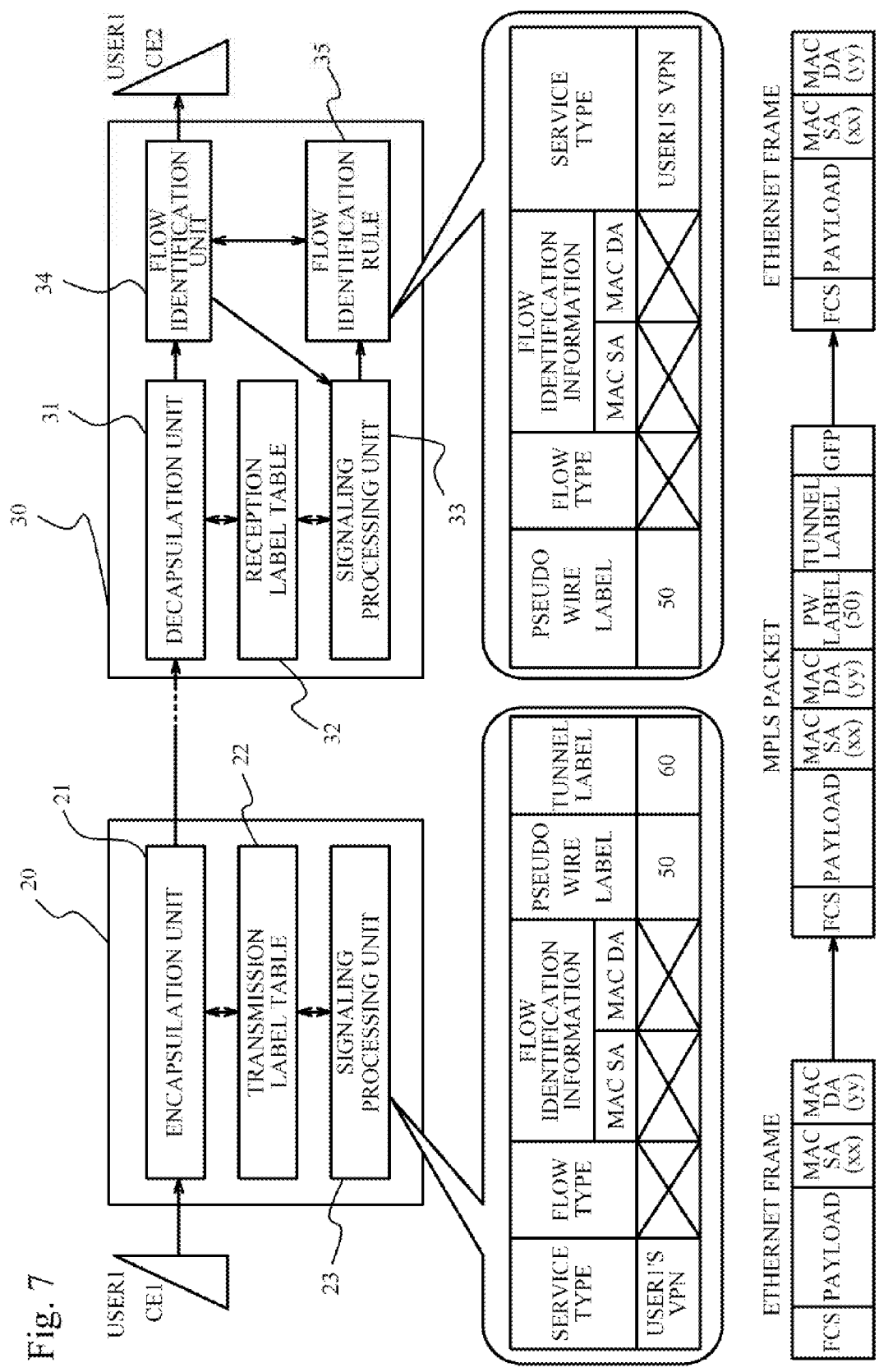
FIG. 7 is a schematic view illustrating that a flow is identified automatically.
Figure 8:
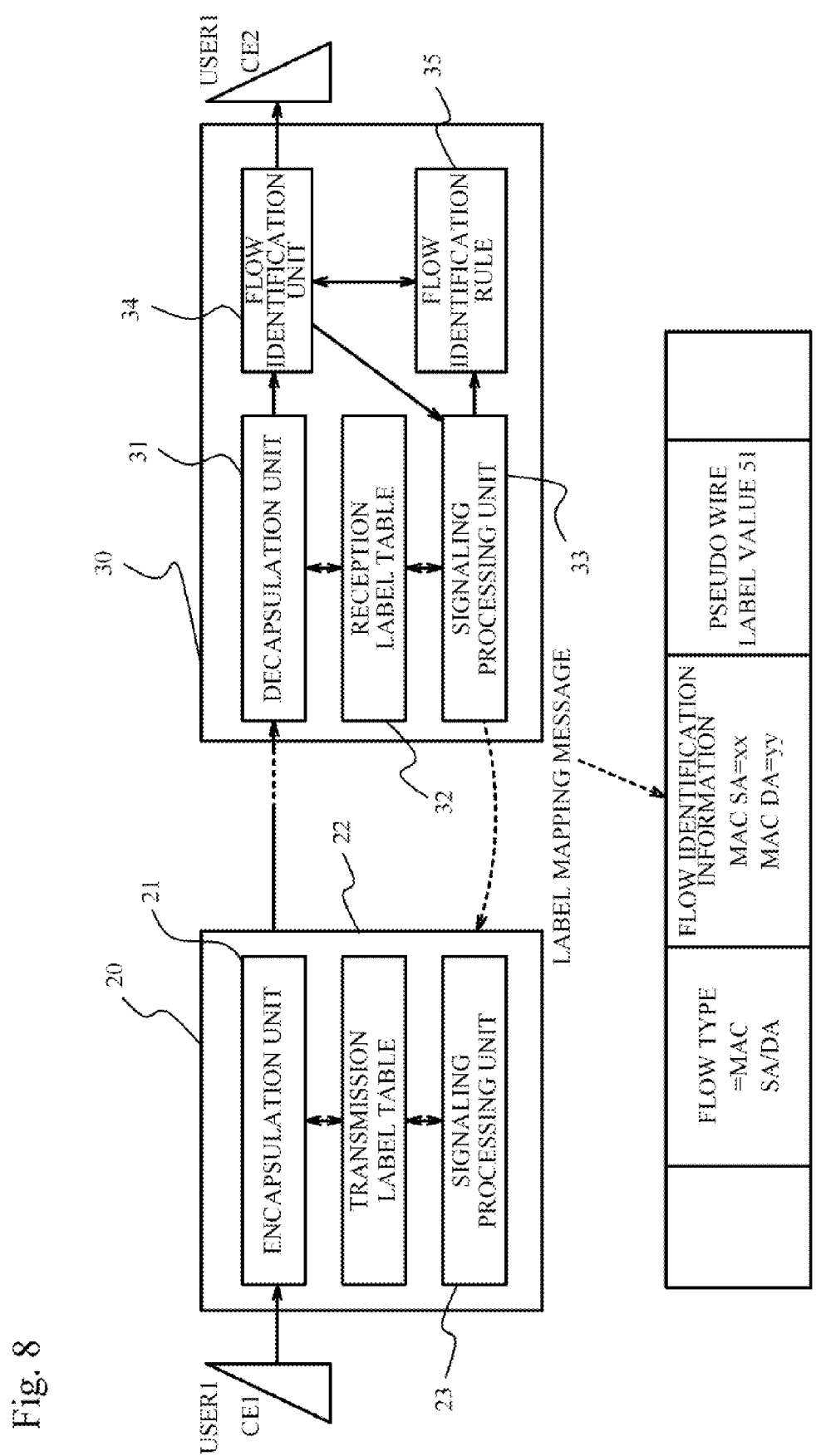
FIG. 8 is a schematic view illustrating that a flow is identified automatically.

FIG. 7 and FIG. 8 are schematic views to describe the tangible example when the flow is identified automatically. For example, when the Ethernet (standardized by IEEE 802.3 committee) frames with the same combination of MAC SA/DA passes over the predetermined number of times (e.g. 10 times) within a predetermined time period (e.g. 1 second), the flow with the flow type of MAC SA/DA and the flow identification information of the detected MAC SA/DA is detected. When the Ethernet (standardized by IEEE 802.3 committee) frame with this combination of MAC SA/DA does not pass for predetermined time (e.g. 5 seconds), the flow is discarded.

FIG. 7 illustrates the condition before the flow is detected. Before the flow is detected, only the pseudo wire label that does not have the flow type and the flow identification information is assigned to the USER 1's VPN. This label is assigned with existing techniques (e.g. RFC4447 signaling).

Upon receiving the Ethernet (standardized by IEEE 802.3 committee) frame to the USER 1's VPN, the encapsulation unit 21 encapsulates it with the pseudo wire label 50 and the tunnel label 60, which don't have the flow type and the flow identification information, and transmits the MPLS packet to the MPLS network 40. The MPLS network 40 transmits the packet to the egress edge node 30 while converting the tunnel label value.

Upon receiving the packet with the pseudo wire label 50, based on the reception label table, the decapsulation unit 31 determines that the packet is within the USER 1's VPN and is not flow-identified. In this case, the decapsulation unit 31 deletes the tunnel label and the pseudo wire label, and forwards the Ethernet (standardized by IEEE 802.3 committee) frame to the USER 1's VPN. In this embodiment, the decapsulation unit 31 detects the flow, when the frames with the same combination of MAC SA and MAC DA pass 10 times within 1 second.

When the flow is detected, the flow detection signal that has the flow type and the flow identification information is transmitted from the flow identification unit 34 to the signaling processing unit 33. The pseudo wire label for the detected flow is reported to the ingress edge node 20 with the label mapping message. This is illustrated in FIG. 8.

FIG. 8 illustrates a case that the Ethernet (standardized by IEEE 802.3 committee) frame with MAC SA of xx and MAC DA of yy enters the flow identification unit 34 10 times within 1 second. The flow identification unit 34 detects the flow according to the flow identification rule stored in the flow identification rule storage 35. The flow identification unit 34 transmits the flow detection signal, which has the flow type of MAC SA/DA; MAC SA of xx; and MAC DA of yy, to the signaling processing unit 33.

The signaling processing unit 33 assigns a pseudo wire label to this flow, and reports the pseudo wire label to the ingress edge node 20 with the label mapping message. The signaling processing unit 33 writes the pseudo wire label corresponding to the flow type and the flow identification information into the reception label table.

Figure 9:
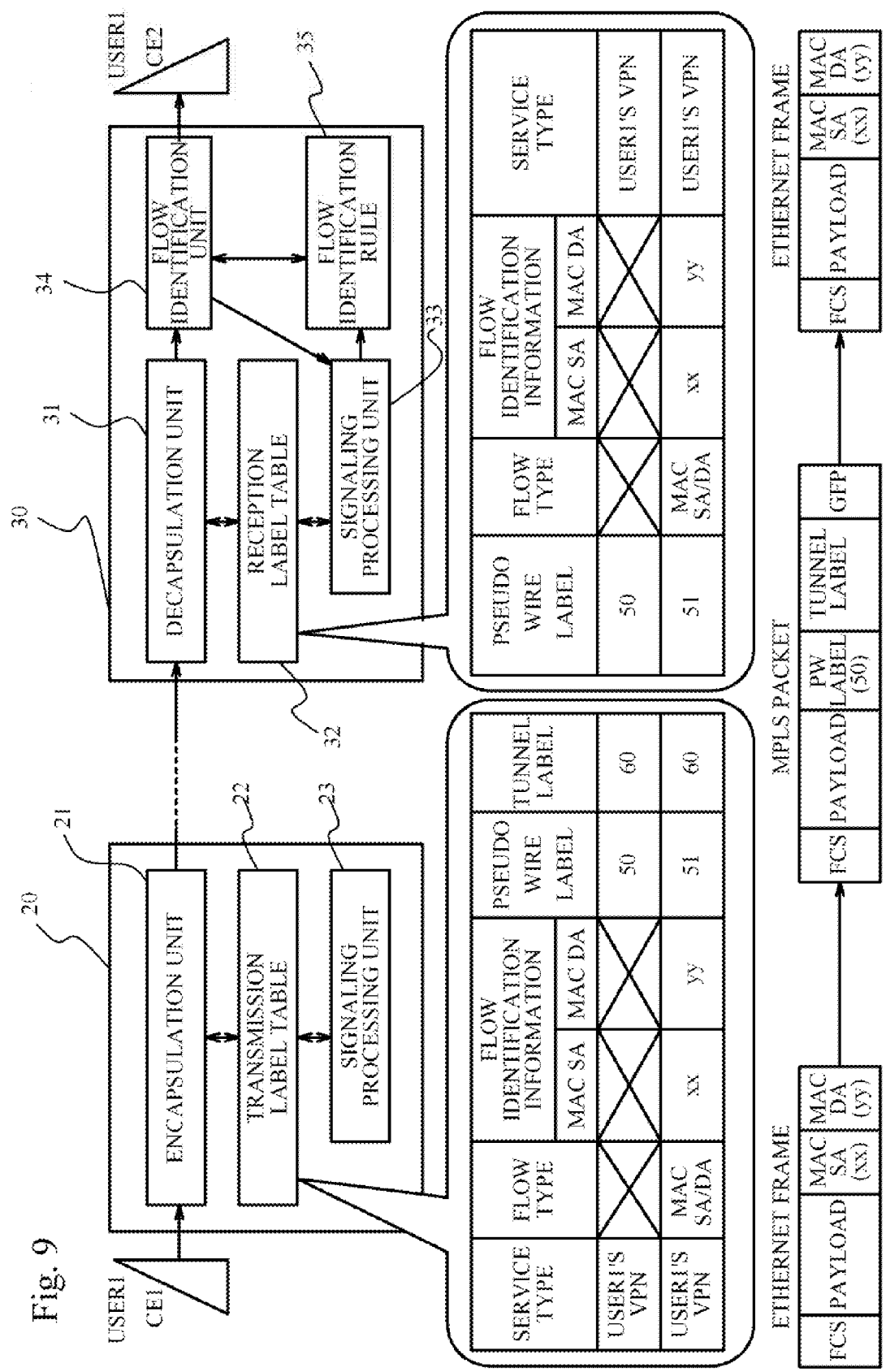
FIG. 9 illustrates a transmission label table and a reception label table updated.

In the ingress edge node 20, the signaling processing unit 23 receives the label mapping message. The signaling processing unit 23 writes the received flow type and the received flow identification information, and the pseudo wire label value corresponding to the flow type and the flow identification information into the transmission label table. FIG. 9 illustrates the condition after the transmission label table and the reception label table are updated by the operation described above.

Under this condition, assume that the ingress edge node 20 receives the Ethernet (standardized by IEEE 802.3 committee) frame with the combination of MAC SA and MAC DA that is xx and yy set in the transmission label table within the USER 1's VPN. In this case, the encapsulation unit 21 deletes the flow identification information MAC SA/DA from the Ethernet (standardized by IEEE 802.3 committee) frame, adds the pseudo wire label 51 and the tunnel label 60 corresponding to MAC SA of xx and MAC DA of yy, and transmits the MPLS packet to the MPLS network 40. The MPLS network 40 transmits the packet to the egress edge node 30 while converting the tunnel label value.

Upon receiving the packet with the pseudo wire label 51, the decapsulation unit 31 determines that the packet is related to the flow with MAC SA of xx and MAC DA of yy within the USER 1's VPN based on the reception label table. In this case, the decapsulation unit 31 deletes the tunnel label and the pseudo wire label, regenerates the Ethernet (standardized by IEEE 802.3 committee) frame by adding MAC SA of xx and MAC DA of yy, and forwards the Ethernet (standardized by IEEE 802.3 committee) frame to the USER1's VPN.

When a MAC frame with MAC SA of xx and MAC DA of yy does not pass for predetermined time, the flow identification unit 34 determines that this flow disappears. In this case, a flow release signal, which has the flow type and the flow identification information, is transmitted from the flow identification unit 34 to the signaling processing unit 33. Thus, the release of the pseudo wire label assignment to the flow is reported with the label withdraw message extended to deliver the flow type and the flow identification information to the ingress edge node 20. This is illustrated in FIG. 10.

Figure 10:
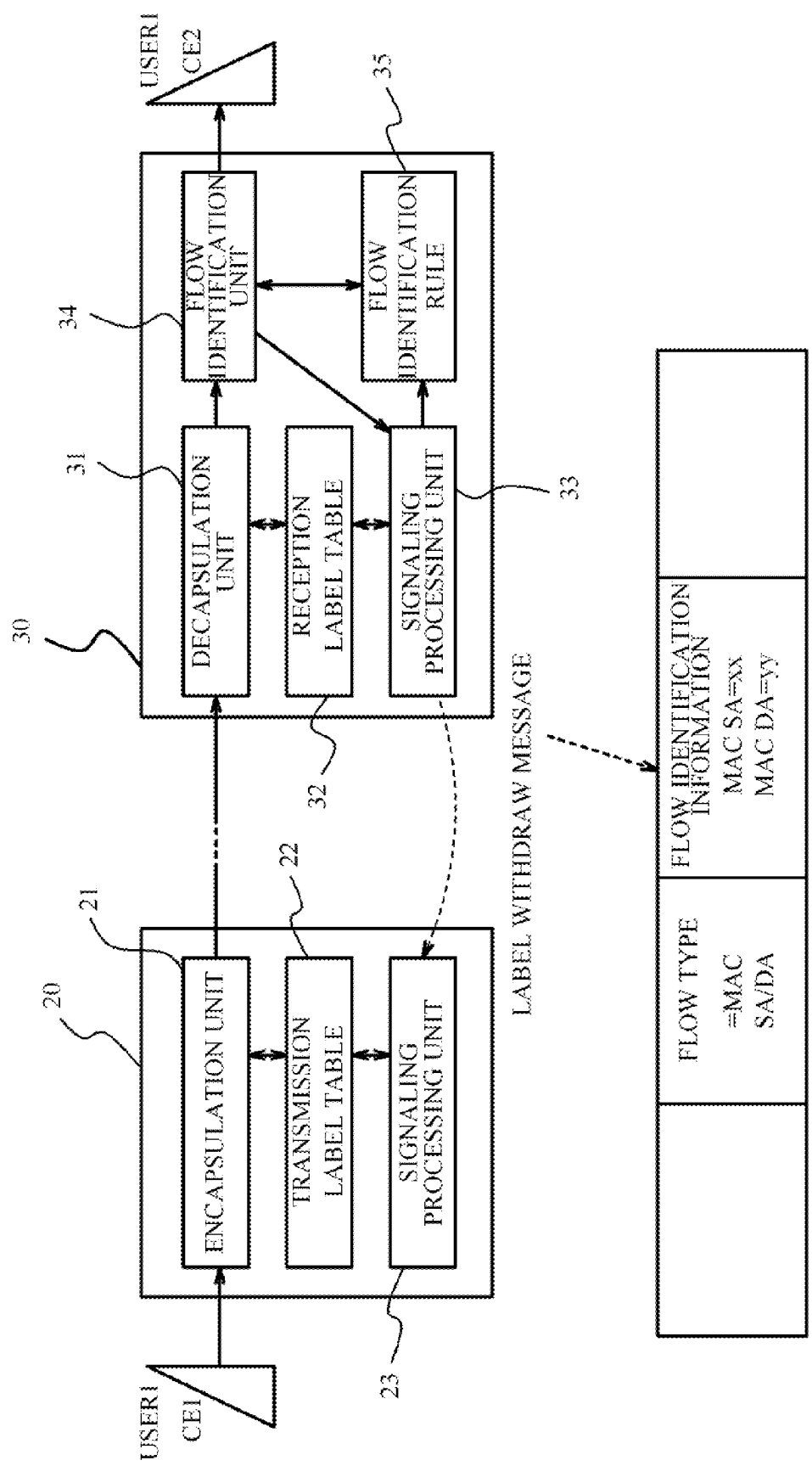
FIG. 10 is an exemplary diagram illustrating that a release of a pseudo wire label assignment to a flow is reported.

FIG. 10 illustrates a case that the Ethernet (standardized by IEEE 802.3 committee) frame with MAC SA of xx and MAC DA of yy does not enter to the flow identification unit 34 for over 5 seconds under the condition that the Ethernet (standardized by IEEE 802.3 committee) frame with MAC SA of xx and MAC DA of yy is identified as the flow by the flow identification unit 34.

The flow identification unit 34 releases the flow according to the flow identification rule stored in the flow identification rule storage 35. The flow identification unit 34 transmits the flow release signal, which has the flow type of MAC SA/DA; and the flow identification information MAC SA of xx and MAC DA of yy, to the signaling processing unit 33. The signaling processing unit 33 releases the pseudo wire label assigned to this flow, and reports the release of the pseudo wire label to the ingress edge node 20 with the label withdraw message. The signaling processing unit 33 deletes the pseudo wire label corresponding to the flow type and the flow identification information from the reception label table.

In the ingress edge node 20, upon receiving the label withdraw message, the signaling processing unit 23 deletes the entry that has the received flow type and the received flow identification information from the transmission label table. When the transmission label table and the reception label table are updated by these operations, the condition goes back to the condition illustrated in FIG. 7.

According to this embodiment, the transmission label table and the reception label table are set automatically. The amount of information to be transmitted within the MPLS network 40 is reduced by assigning the pseudo wire label to each flow. The reduction in the amount of information improves the use efficiency of the MPLS network 40.

Fourth Embodiment

In the fourth embodiment, the ingress edge node 20 includes a flow identification rule storage 24 and a flow identification unit 25. In this embodiment, when a flow is identified, the pseudo wire label is assigned to the flow dynamically with signaling. In this embodiment, when the Ethernet (standardized by IEEE 802.3 committee) frames with the same combination of MAC SA/DA pass over the predetermined number of times (e.g. 10 times) within a predetermined time period (e.g. 1 second), the flow that has the flow type of MAC SA/DA; and MAC SA and MAC DA of the detected values as the flow identification information is detected. When the Ethernet (standardized by IEEE 802.3 committee) frame with this combination of MAC SA/DA does not pass for predetermined time (e.g. 5 seconds), the flow is discarded.

Figure 11:
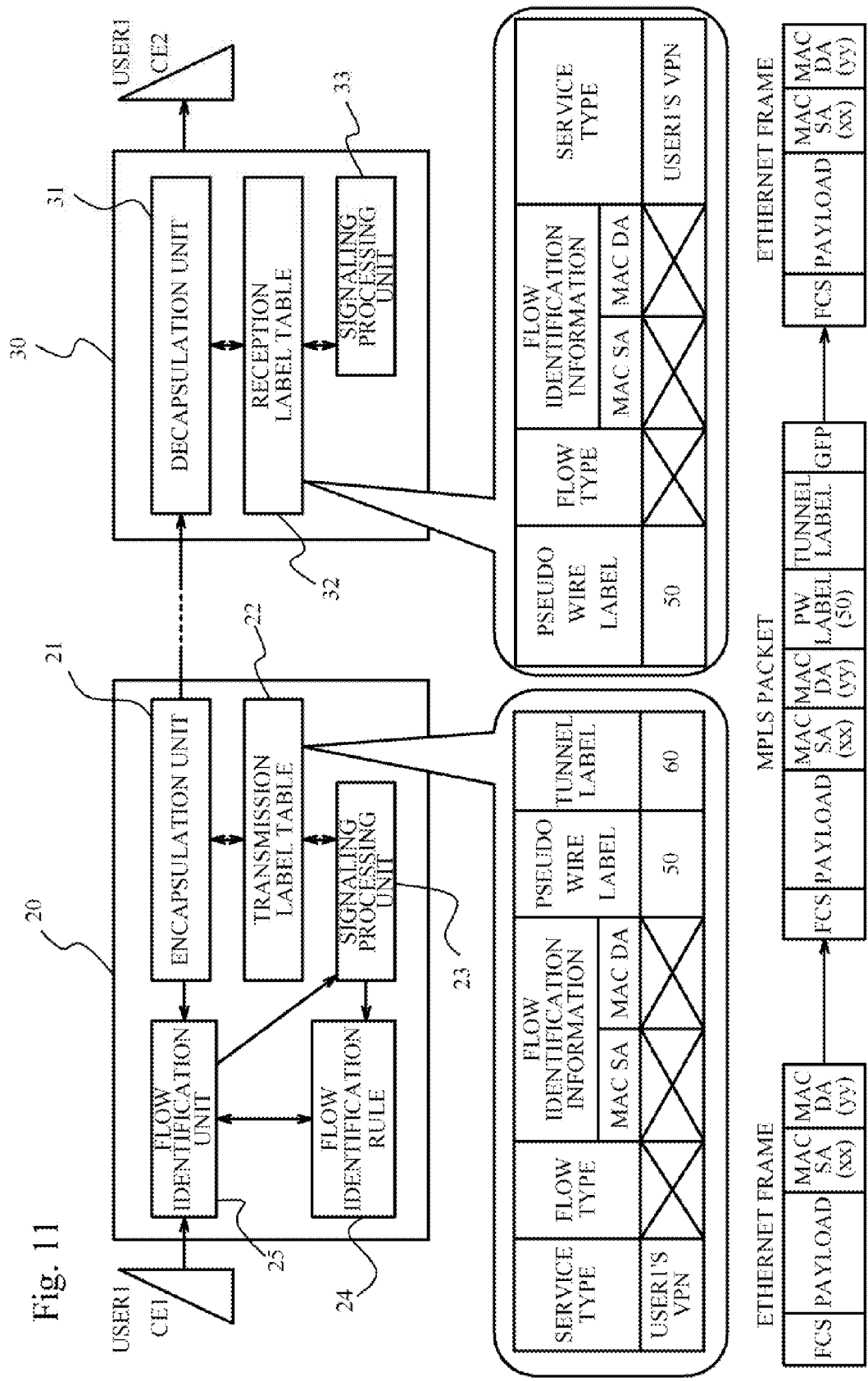
FIG. 11 illustrates a condition before a flow is detected.

FIG. 11 illustrates the condition before the flow is detected in the fourth embodiment. Before the flow is detected, only the pseudo wire label that does not have the flow type and the flow identification information is assigned to the USER 1's VPN. This label is assigned with existing techniques (e.g. RFC4447 signaling). Under this condition, upon receiving the Ethernet (standardized by IEEE 802.3 committee) frame to the USER 1's VPN, the encapsulation unit 21 encapsulates the Ethernet (standardized by IEEE 802.3 committee) frame with the pseudo wire label 50 and the tunnel label 60, which don't have the flow type and the flow identification information, and transmits the MPLS packet to the MPLS network 40. The MPLS network 40 transmits the packet to the egress edge node 30 while converting the tunnel label value.

Upon receiving the packet with the pseudo wire label 50, based on the reception label table, the decapsulation unit 31 determines that the packet is within the USER 1's VPN and is not flow-identified. The decapsulation unit 31 deletes the tunnel label and the pseudo wire label, and forwards the Ethernet (standardized by IEEE 802.3 committee) frame to the USER 1's VPN.

In this embodiment, when the Ethernet (standardized by IEEE 802.3 committee) frames with the same combination of MAC SA and MAC DA pass the predetermined number of times (e.g. 10 times) within a predetermined time period (e.g. 1 second), the flow identification unit 25 transmits the flow detection signal, which has the flow type and the flow identification information, to the signaling processing unit 23. The flow identification unit 25 requests the assignment of the pseudo wire label to the detected flow with the label request message extended to deliver the flow type and the flow identification information to the egress edge node 30. The signaling processing unit 33 of the egress edge node 30 assigns a pseudo wire label to the flow type and the flow identification information that are requested, and reports the pseudo wire label with the label mapping message. This is illustrated in FIG. 12.

Figure 12:
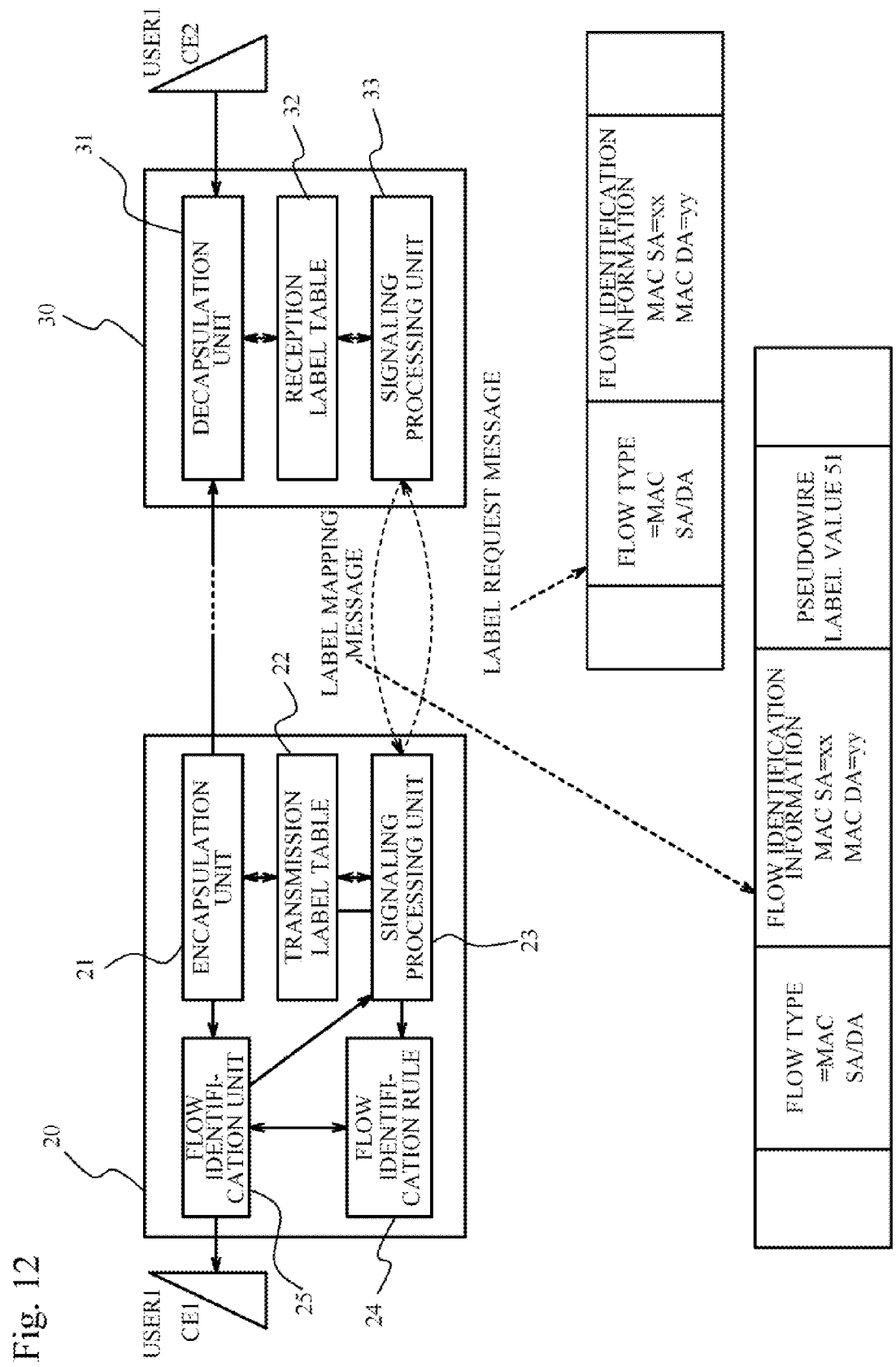
FIG. 12 is an exemplary diagram illustrating that a pseudo wire label to the detected flow is reported.

FIG. 12 illustrates the assumption that the Ethernet (standardized by IEEE 802.3 committee) frame with MAC SA of xx and MAC DA of yy enters the flow identification unit 25 10 times within 1 second. The flow identification unit 25 detects the flow according to the flow identification rule stored in the flow identification rule storage 24. The flow identification unit 25 transmits the flow detection signal, which has the flow type of MAC SA/DA; and the flow identification information MAC SA of xx and MAC DA of yy, to the signaling processing unit 23.

The signaling processing unit 23 requests the egress edge node 30 to assign the pseudo wire label to this flow with the label request message. Upon receiving the label request message, the signaling processing unit 33 assigns a pseudo wire label to the flow type and the flow identification information that are reported. The signaling processing unit 33 writes the pseudo wire label corresponding to this flow type and this flow identification information into the reception label table. The signaling processing unit 33 reports the pseudo wire label to the ingress edge node 20 with the label mapping message.

Figure 13:
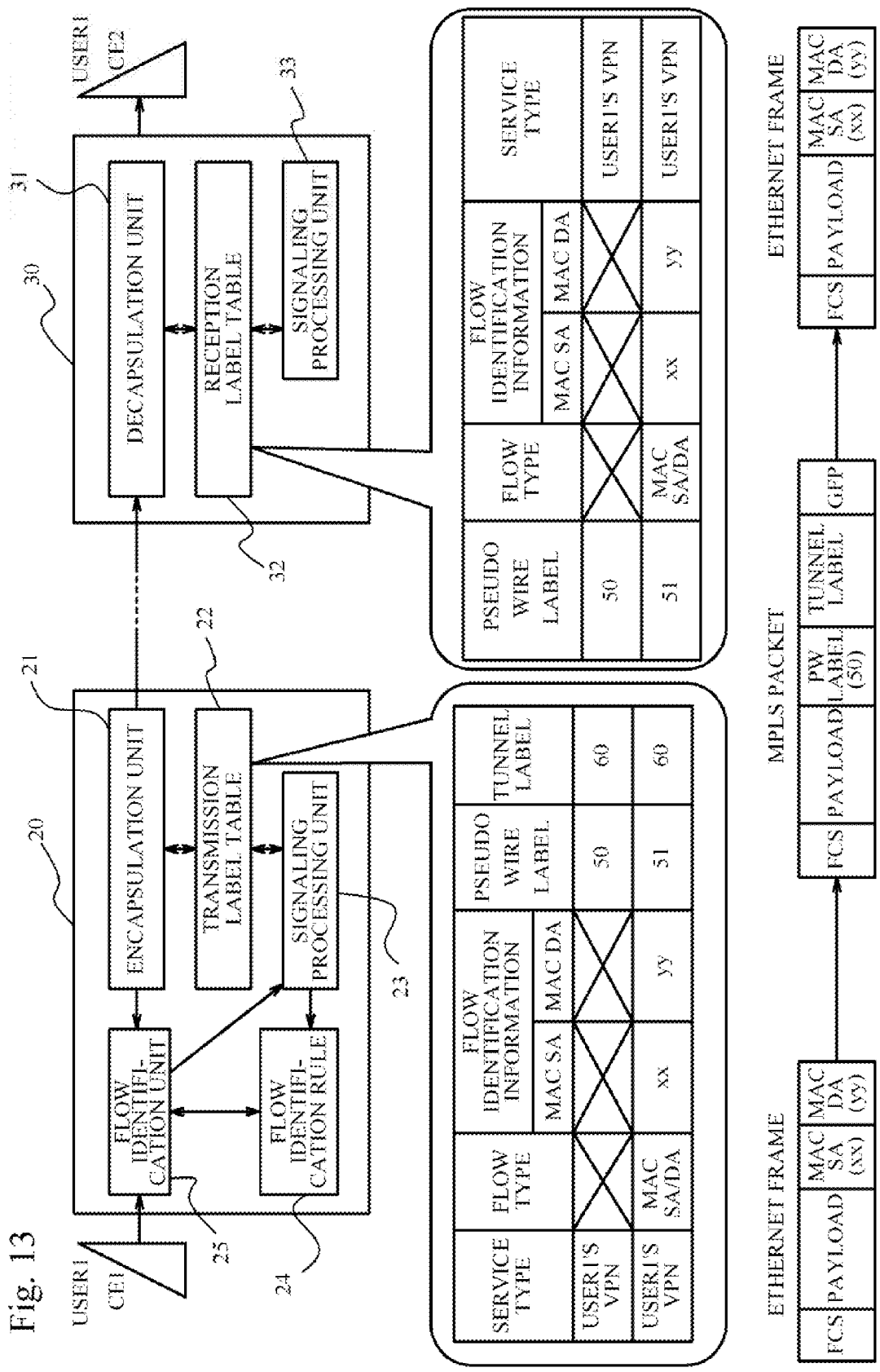
FIG. 13 illustrates a transmission label table and a reception label table updated.

In the ingress edge node 20, upon receiving the label mapping message, the signaling processing unit 23 writes the received flow type, the received flow identification information, and the pseudo wire label corresponding to the flow type and the flow identification information into the transmission label table. The condition after the transmission label table and the reception label table are updated by these operations is illustrated in FIG. 13.

The ingress edge node 20 receives the Ethernet (standardized by IEEE 802.3 committee) frame with the combination of MAC SA and MAC DA that is xx and yy set in the transmission label table within the USER 1's VPN under this condition. In this case, the ingress edge node 20 deletes the flow identification information MAC SA and MAC DA from the Ethernet (standardized by IEEE 802.3 committee) frame, adds the pseudo wire label 51 and the tunnel label 60 corresponding to MAC SA of xx and MAC DA of yy, and transmits the MPLS packet to the MPLS network 40. The MPLS network 40 transmits the packet to the egress edge node 30 while converting the tunnel label value.

Upon receiving the packet with the pseudo wire label 51, the decapsulation unit 31 determines that the packet belongs to the flow with MAC SA of xx and MAC DA of yy within the USER 1's VPN based on the reception label table. In this case, the decapsulation unit 31 deletes the tunnel label and the pseudo wire label, regenerates the Ethernet (standardized by IEEE 802.3 committee) frame by adding MAC SA of xx and MAC DA of yy, and forwards the Ethernet (standardized by IEEE 802.3 committee) frame to the USER 1's VPN.

When a MAC frame with MAC SA of xx and MAC DA of yy stops passing, the flow identification unit 25 determines that this flow disappears. In this case, the flow release signal, which has the flow type and flow identification information, is transmitted from the flow identification unit 25 to the signaling processing unit 23. The release of the assignment of the pseudo wire label to the flow is reported by the signaling processing unit 23 with the label release message extended to deliver the flow type and the flow identification information to the egress edge node 30. This is illustrated in FIG. 14.

Figure 14:
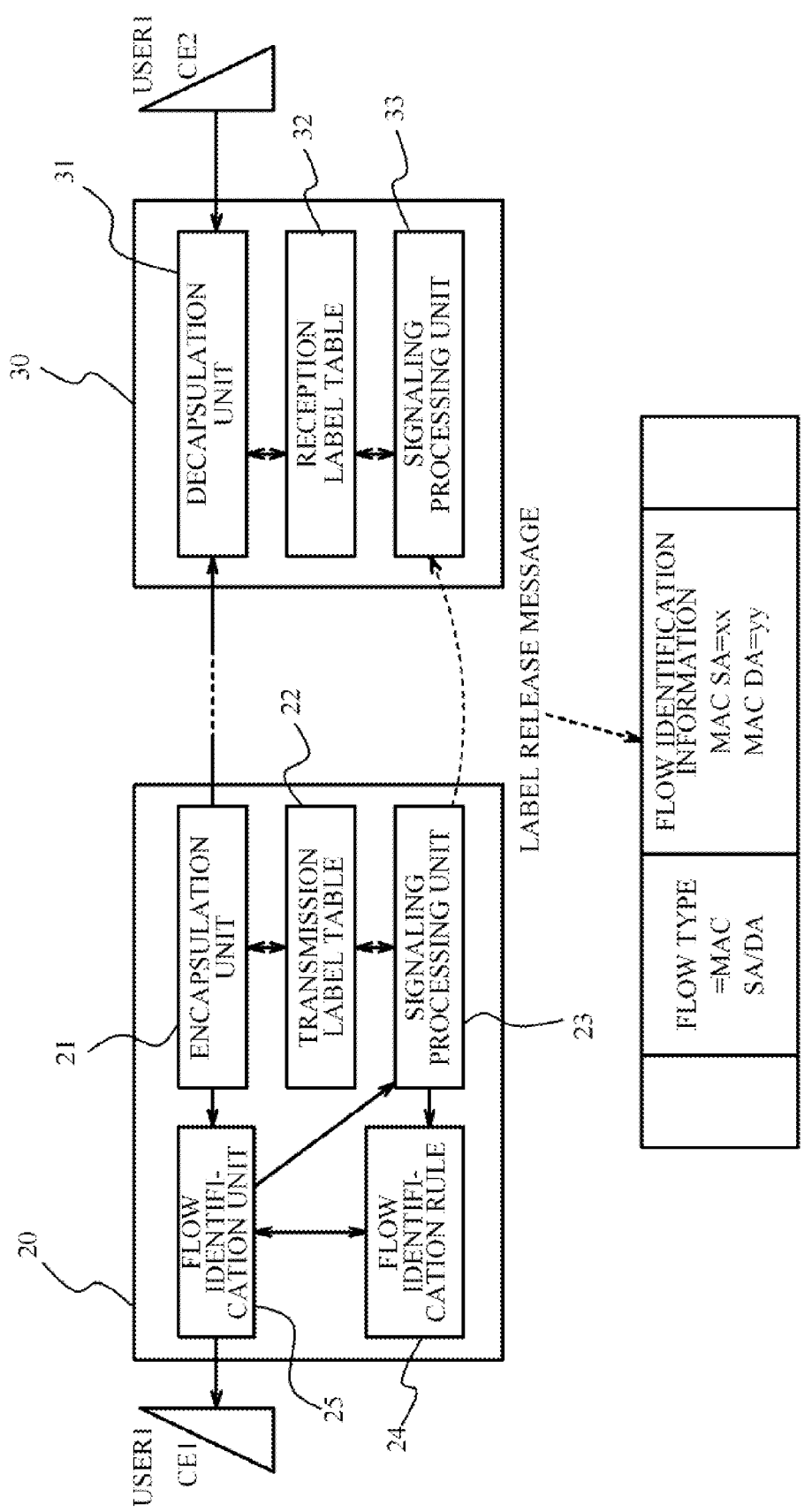
FIG. 14 is an exemplary diagram illustrating that a release of a pseudo wire label assignment to a flow is reported.

FIG. 14 illustrates a case that the Ethernet (standardized by IEEE 802.3 committee) frame with MAC SA of xx and MAC DA of yy does not enter the flow identification unit 25 for over 5 seconds under the condition that the Ethernet (standardized by IEEE 802.3 committee) frame with MAC SA of xx and MAC DA of yy is identified as the flow by the flow identification unit 25.

The flow identification unit 25 releases the flow according to the flow identification rule stored in the flow identification rule storage 24. The flow identification unit 25 transmits the flow release signal, which has the flow type of MAC SA/DA; and the flow identification information MAC SA of xx and MAC DA of yy, to the signaling processing unit 23. The signaling processing unit 23 releases the pseudo wire label assigned to this flow, and reports the release of the pseudo wire label to the egress edge node 30 with the label release message. The signaling processing unit 23 deletes the pseudo wire label corresponding to the flow type and the flow identification information from the transmission label table.

Upon receiving the label release message from the ingress edge node 20, the signaling processing unit 33 deletes the entry that has the received flow type and the received flow identification information from the reception label table. When the transmission label table and the reception label table are updated by these operations, the condition goes back to the condition illustrated in FIG. 11.

According to this embodiment, the transmission label table and the reception label table are set automatically. By assigning the pseudo wire label to each flow, the amount of information to be transmitted within the MPLS network 40 is reduced. The reduction in the amount of information improves the use efficiency of the MPLS network 40.

Note that the condition that the flow is detected is not limited to the condition described in the embodiments above, although in the embodiments above the flow is detected when the frames with the same combination of MAC SA/DA pass over the predetermined number of times. For example, the flow that has certain MAC SA/DA and certain IP SA/DA as flow identification information can be detected, when the frames that have the same combination of MAC SA/DA and the same combination of IP SA/DA pass over the predetermined number of times within a predetermined time period. The flow that has certain MAC SA/DA and certain IP SA/DA as flow identification information can be detected, when the frame that has the same combination of MAC SA/DA, the same combination of IP SA/DA and application information of predetermined applications is detected.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various change, substitutions, and alterations could be made hereto without departing from the spirit and scope of the invention.

What is claimed is:

1. A communication device comprising:
    a transmission label table storage that maps header information to both a pseudo wire label and a Multi Protocol Label Switching (MPLS) tunnel label; and
    an encapsulation unit that receives an Ethernet packet which is compliant with IEEE standard 802.3 dated Dec. 9, 2005, utilizes the header information in the Ethernet packet to determine an appropriate pseudo wire label and an appropriate MPLS tunnel label from the transmission label table, deletes the header information in the Ethernet packet, adds said appropriate pseudo wire label and said appropriate MPLS tunnel label to the Ethernet packet, and transmits the Ethernet packet over a MPLS network.

2. The communication device according to claim 1 wherein the header information is manually set.

3. The communication device according to claim 1 wherein the header information includes a flow type and flow identification information.

4. The communication device according to claim 3, further comprising:
    a flow identification unit that identifies a flow; and
    a reporting unit that detects the flow automatically according to a predetermined flow identification rule, assigns a pseudo wire label to the detected flow automatically, and reports the pseudo wire label to an egress edge node.

5. The communication device according to claim 4 wherein the reporting unit releases the assignment of the pseudo wire label automatically when the flow is not detected, and reports the pseudo wire label value to the egress edge node.

6. The communication device according to claim 4 wherein the flow identification rule is that the reporting unit detects the flow that has a specified MAC SA (Medium Access Control Source Address) value and a specified MAC DA (Medium Access Control Destination Address) value as the flow identification information when the frames with a same combination of MAC SA/DA (Medium Access Control Source Address/Destination Address) pass the predetermined number of times within a predetermined time period.

7. The communication device according to claim 4 wherein the flow identification rule is that the reporting unit detects the flow that has a specified MAC SA (Medium Access Control Source Address) value, a specified MAC DA (Medium Access Control Destination Address) value, a specified IP SA (Internet Protocol Source Address) value, and a specified IP DA (Internet Protocol Destination Address) value as flow identification information when the frames that have a same combination of MAC SA/DA (Medium Access Control Source Address/Destination Address) and a same combination of IP SA/DA (Internet Protocol Source Address/Destination Address) pass the predetermined number of times within a predetermined time period.

8. The communication device according to claim 4 wherein the flow identification rule is that the reporting unit detects the flow that has a specified MAC SA (Medium Access Control Source Address) value, a specified MAC DA (Medium Access Control Destination Address) value, a specified IP SA (Internet Protocol Source Address) value, and a specified IP DA (Internet Protocol Destination Address) value as flow identification information when the frames that have a same combination of MAC SA/DA (Medium Access Control Source Address/Destination Address), a same combination of IP SA/DA (Internet Protocol Source Address/Destination Address), and application information of the specified application pass the predetermined number of times within a predetermined time period.

9. A communication device comprising:
    a reception label table storage that maps header information to both a pseudo wire label and a Multi Protocol Label Switching (MPLS) tunnel label; and
    a decapsulation unit that receives a packet and extracts both pseudo wire label and MPLS tunnel label from the packet, utilizes both the pseudo wire label and the MPLS tunnel label to determine an appropriate header information from the reception label table, creates an Ethernet packet which is compliant with IEEE standard 802.3 dated Dec. 9, 2005 by deleting the both the pseudo wire label and the MPLS tunnel label and by adding the appropriate header information to the Ethernet packet, and transmits the Ethernet packet to an Ethernet port.

10. The communication device according to claim 9 wherein the header information is manually set.

11. The communication device according to claim 9 wherein the header information includes a flow type and flow identification information.

12. The communication device according to claim 11, further comprising:
a flow identification unit that identifies a flow; and
a reporting unit that detects the flow automatically according to a predetermined flow identification rule, assigns a pseudo wire label to the detected flow automatically, and reports the pseudo wire label to an ingress edge node.

13. The communication device according to claim 12 wherein the reporting unit releases the assignment of the pseudo wire label automatically when the flow is not detected, and reports the pseudo wire label value to the ingress edge node.

14. The communication device according to claim 12 wherein the flow identification rule is that the reporting unit detects the flow that has a specified MAC SA (Medium Access Control Source Address) value and a specified MAC DA (Medium Access Control Destination Address) value as the flow identification information when the frames with a same combination of MAC SA/DA (Medium Access Control Source Address/Destination Address) pass the predetermined number of times within a predetermined time period.

15. The communication device according to claim 12 wherein the flow identification rule is that the reporting unit detects the flow that has a specified MAC SA (Medium Access Control Source Address) value, a specified MAC DA (Medium Access Control Destination Address) value, a specified IP SA (Internet Protocol Source Address) value, and a specified IP DA (Internet Protocol Destination Address) value as flow identification information when the frames that have a same combination of MAC SA/DA (Medium Access Control Source Address/Destination Address) and a same combination of IP SA/DA (Internet Protocol Source Address/Destination Address) pass the predetermined number of times within a predetermined time period.

16. The communication device according to claim 12 wherein the flow identification rule is that the reporting unit detects the flow that has a specified MAC SA (Medium Access Control Source Address) value, a specified MAC DA (Medium Access Control Destination Address) value, a specified IP SA (Internet Protocol Source Address) value, and a specified IP DA (Internet Protocol Destination Address) value as flow identification information when the frames that have a same combination of MAC SA/DA (Medium Access Control Source Address/Destination Address), a same combination of IP SA/DA (Internet Protocol Source Address/Destination Address), and application information of the specified application pass the predetermined number of times within a predetermined time period.

17. A communication method comprising:
reading Ethernet header information from an original Ethernet packet which contains both layer information and upper layer information, wherein said Ethernet packet and said Ethernet header information are compliant with IEEE standard 802.3 dated 9 Dec. 2005;
utilizing the Ethernet header information to determine a pseudo wire label, deleting the Ethernet header information from the original Ethernet packet, and transmitting the Ethernet packet without the Ethernet header information over a pseudo wire, by an ingress edge node of a Multi Protocol Label Switching (MPLS) network; and
receiving the Ethernet packet without the Ethernet header information, and adding the Ethernet header information to the Ethernet packet without the Ethernet information in order to recreate the original Ethernet packet, by egress node.

18. The communication method according to claim 17 wherein the header information includes a flow type and flow identification information.

19. The communication method according to claim 18 further comprising:
identifying a flow; and
detecting the flow automatically according to a predetermined flow identification rule, and assigning a pseudo wire label to the extracted flow automatically.

20. The communication method according to claim 19 further comprising releasing the assignment of the pseudo wire label automatically when the flow is not detected.

* * * * *